US008014574B2

(12) United States Patent
Hara

(10) Patent No.: US 8,014,574 B2
(45) Date of Patent: Sep. 6, 2011

(54) CHARACTER NOISE ELIMINATING APPARATUS, CHARACTER NOISE ELIMINATING METHOD, AND CHARACTER NOISE ELIMINATING PROGRAM

(75) Inventor: Masanori Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 1002 days.

(21) Appl. No.: 11/844,819

(22) Filed: Aug. 24, 2007

(65) Prior Publication Data

US 2008/0056546 A1    Mar. 6, 2008

(30) Foreign Application Priority Data

Sep. 4, 2006    (JP) .................................. 2006-239554

(51) Int. Cl.
*G06K 9/00* (2006.01)
*G06K 9/40* (2006.01)
*G06K 9/74* (2006.01)
*G06T 5/00* (2006.01)
*H04N 1/38* (2006.01)

(52) U.S. Cl. ........ 382/124; 382/125; 382/275; 382/254; 382/187; 356/71; 358/3.26; 358/463

(58) Field of Classification Search ........................ None
See application file for complete search history.

(56) References Cited

U.S. PATENT DOCUMENTS

| | | | | | |
|---|---|---|---|---|---|
| 4,532,548 | A | * | 7/1985 | Zwirn | 348/625 |
| 5,201,013 | A | * | 4/1993 | Kumagai | 382/270 |
| 5,805,723 | A | * | 9/1998 | Fujiwara | 382/172 |
| 5,841,899 | A | * | 11/1998 | Ide et al. | 382/168 |
| 5,926,579 | A | * | 7/1999 | Uejo et al. | 382/272 |
| 6,144,758 | A | * | 11/2000 | Fukushima et al. | 382/128 |
| 6,167,154 | A | * | 12/2000 | Renaud et al. | 382/174 |
| 6,324,309 | B1 | * | 11/2001 | Tokuyama et al. | 382/300 |
| 6,621,595 | B1 | * | 9/2003 | Fan et al. | 358/3.26 |
| 6,829,372 | B2 | * | 12/2004 | Fujioka | 382/103 |
| 7,133,542 | B2 | * | 11/2006 | Takeuchi et al. | 382/124 |
| 7,321,447 | B2 | * | 1/2008 | Kuiper | 358/1.9 |
| 7,492,945 | B2 | * | 2/2009 | Yamazaki et al. | 382/187 |

(Continued)

FOREIGN PATENT DOCUMENTS

| FR | 2905188 A1 | 2/2008 |
|---|---|---|
| JP | 52-97298 | 8/1977 |

(Continued)

OTHER PUBLICATIONS

Cannon, et al., "Background pattern removal by power spectral filtering", Applied Optics, Mar. 15, 1983, pp. 777-779, vol. 22, No. 6, Optical Society of America.

(Continued)

*Primary Examiner* — Bhavesh Mehta
*Assistant Examiner* — Michelle Entezari
(74) *Attorney, Agent, or Firm* — Sughrue Mion, PLLC

(57) ABSTRACT

To provide a noise eliminating apparatus and the like that can eliminate an atypical shaped background noise. A character noise eliminating apparatus includes a character noise area detecting device for detecting a character noise area which is an area corresponding to a character noise from an image, a density conversion area layer determining device for setting a plurality of density conversion area layers inside and outside the character noise area, and a density converting device for setting a neighboring pixel group within the same density conversion area layer as the density conversion area layer to which a target pixel belongs as a reference area of the target pixel, with respect to pixels in the density conversion area layers, and generating a density converted image applying a local image enhancement.

16 Claims, 14 Drawing Sheets

U.S. PATENT DOCUMENTS

| | | | |
|---|---|---|---|
| 7,679,778 B2 * | 3/2010 | Aoyama | 358/1.9 |
| 7,760,958 B2 * | 7/2010 | Sato et al. | 382/254 |
| 2002/0061176 A1 | 5/2002 | Libori et al. | |
| 2003/0202693 A1 * | 10/2003 | Nakajima et al. | 382/170 |
| 2004/0120555 A1 * | 6/2004 | Lo | 382/124 |
| 2005/0069179 A1 * | 3/2005 | Hwang et al. | 382/124 |
| 2005/0100200 A1 * | 5/2005 | Abiko et al. | 382/124 |

FOREIGN PATENT DOCUMENTS

| | | |
|---|---|---|
| JP | 9-6957 A | 1/1997 |
| JP | 2001-118062 A | 4/2001 |
| JP | 2002-99912 A | 4/2002 |
| JP | 2002-288641 A | 10/2002 |
| JP | 2003-227941 A | 8/2003 |
| JP | 2003-281527 A | 10/2003 |
| WO | 02-37400 A1 | 5/2002 |
| WO | 2008-127325 A1 | 10/2008 |

OTHER PUBLICATIONS

Hong, et al., "Fingerprint Image Enhancement: Algorithm and Performance Evaluation", IEEE Transactions on Pattern Analysis and Machine Intelligence, pp. 1-30, 1998.

"ANSI/NIST-ITL-1-2000 Data Format for the Interchange of Fingerprint, Facial, & Scar Mark & Tattoo (SMT) Information", standardized by National Institute of Standards and Technology (US), Sep. 2000.

R Goto and AL.:"wide-band single-mode photonic band-gap fiber with extended triangular lattice and capillary core" Proceedings Optical Fiber Communication Conference 2006, Mar. 5, 2006, pp. 1-3, XP002442304 Piscataway, NJ USA * p. 2 *.

Katsuhiro Takenaga et al.: "a new photonic bandgap fibre with extended triangular lattice and capillary core" Proceedings ECOC 2005, vol. 2, Sep. 25, 2005, pp. TU 4.2-1-TU 4.2-2, XP002442305 Glasgow, GB * the whole document *.

Barkou S E et al: "Photonic bandgap fibers" LEOS '99. IEEE Lasers and Electro-Optics Society 1999 12th Annual Meeting San Francisco, CA, USA Nov. 8-11, 1999, Piscataway, NJ, USA,IEEE, US, vol. 2, Nov. 8, 1999, pp. 615-616, XP010360970 ISBN: 0-7803-5634-9 * figure 1 *.

French Search Report issued in Application No. 0757326, dated Feb. 17, 2011.

* cited by examiner

LATENT FINGERPRINT IMAGE GI

IMAGE ENHANCEMENT RESULT GE

BINARY IMAGE B(185) WITH THRESHOLD 185

BINARY IMAGE B(175) WITH THRESHOLD 175

BINARY IMAGE B(165) WITH THRESHOLD 165

CHARACTER NOISE AREA IMAGE CA

DENSITY CONVERSION AREA LAYER
RA_O OUTSIDE CHARACTER NOISE AREA

DENSITY CONVERSION AREA LAYER
RA_I INSIDE CHARACTER NOISE AREA

INPUT IMAGE GI

EDGE LAYER OF CHARACTER NOISE AREA

CONVERSION AREA LAYER RA_O OUTSIDE CHARACTER NOISE AREA

DENSITY CONVERTED IMAGE GR

SYNTHETIC IMAGE GC

ADAPTIVE HISTOGRAM EQUALIZATION METHOD

NEIGHBORHOOD DENSITY VALUE
REPLACEMENT METHOD

CHARACTER NOISE ELIMINATING APPARATUS, CHARACTER NOISE ELIMINATING METHOD, AND CHARACTER NOISE ELIMINATING PROGRAM

This application is based upon and claims the benefit of priority from Japanese patent application No. 2006-239554, filed on Sep. 4, 2006, the disclosure of which is incorporated herein in its entirety by reference.

FIELD OF THE INVENTION

The present invention relates to a system processing digital images with a lot of background noises, such as latent fingerprint images and the like, using a computer.

DESCRIPTION OF THE RELATED ART

Generally, a fingerprint configured with a plurality of streak pattern ridgelines has two main characteristics, permanence and uniqueness. Therefore, fingerprints have been used in criminal investigations from old times. In particular, collation using the latent fingerprints left behind in criminal scenes is effective as a way to help the investigations. Recently, a fingerprint matching system using computers has been introduced, and latent fingerprint matching is conducted in various police agencies.

However, many of the images of the latent fingerprints are of low quality with a noise, which makes it difficult for an investigator to make a judgment. This is also a large factor for hindering the system from being automated. There are many kinds of background noises in the latent fingerprints. One of those is a background noise with irregular shape represented by letters (hereinafter, such a noise is referred to as a "character noise"). FIG. 4 illustrates an example of a latent fingerprint. As in the example, there are cases where fingerprint ridgelines are left on the background noise of handwritten characters. Such character noises are likely to be misjudged and extracted as the fingerprint ridgelines with a related art, so that it is difficult to enhance or extract only the fingerprint ridgelines.

As a related technique for eliminating the background pattern noise, it is common to employ Fourier transformation. Such technique is proposed in "Background Pattern Removal by Power Spectral Filtering", by CANON, et al., Applied Optics, Mar. 15, 1983 (Non-Patent Document 1), for example.

However, when this technique is employed for eliminating the character noises from a fingerprint image, it is necessary for the character noises to appear periodically. Thus, the effect thereof is limited. Further, when the periodicity of the character noises is similar to the periodicity of the fingerprint ridgelines, the fingerprint ridgelines are eliminated as well. Accordingly, the effect is limited. Furthermore, the density of the fingerprint ridgelines in the area with no character noise is deteriorated with the character noise eliminating processing, so that the effect thereof is also limited.

FIG. 13 illustrates the state where the character noises are eliminated from the fingerprint image of FIG. 4 by the related technique. In the case where the periodicity of the character noises is insignificant as in the case of this fingerprint image, the eliminating performance is not sufficient. It can be seen that the density of the fingerprint ridgelines is also deteriorated.

Further, there are various measures proposed as a related method for enhancing the fingerprint ridgelines, in which the direction and periodicity of local ridgelines are extracted, and the ridgelines are enhanced through filter processing that corresponds to the extracted direction and periodicity. This method is proposed in "Fingerprint Image Enhancement: Algorithm and Performance Evaluation (1998)" by Hong, et al., IEEE Transactions on Pattern Analysis and Machine Intelligence (Non-patent Document 2) and Japanese Unexamined Patent Publication 2002-99912 (Patent Document 1).

However, these related arts are not effective when the ridgeline directions and periodicities cannot be extracted properly due to the influence of the character noise. Thus, the issue still remains to be overcome.

While, even if a character noise area is properly extracted, the character noise cannot be eliminated yet in many cases by using the related method as a density conversion method for the area.

FIG. 14A is an image in which a pixel group density of a character noise area shown in FIG. 7 is converted with an adaptive histogram equalization method with respect to a fingerprint image in FIG. 4. This example shows that the character noise is not eliminated sufficiently because the density in the character noise area is highly converted and the density near the edge is lowly converted.

FIG. 14B is an image in which the pixel group density of the character noise area shown in FIG. 7 is converted into a low density value in a neighboring pixel group outside the character noise areas which is assumed as a base paper, with respect to a fingerprint image in FIG. 4. As shown in the example, it is disadvantageous in that ridgeline information is eliminated because inside the character noise area is converted into an approximately even density value. In addition, it is insufficient for eliminating character noise Further, it is also disadvantageous in that the image is appeared to be artificial and unnatural.

SUMMARY OF THE INVENTION

As described above, background noises having atypical shapes such as character noises and the like cannot be extracted and eliminated appropriately with the related arts.

So, an exemplary object of the present invention is to provide a noise eliminating apparatus and the like capable of eliminating a background noise having an atypical shape, represented by the character noise.

As an exemplary aspect of the invention, a character noise eliminating apparatus according to the present invention includes: a character noise area detecting device for detecting a character noise area, which is an area corresponding to a character noise, from an image; a density conversion area layer determining device for setting a plurality of density conversion area layers inside and outside the character noise area; and a density converting device for, as a reference area of a target pixel, setting a neighboring pixel group within the same density conversion area layer as the density conversion area layer to which the target pixel belongs, and generating a density converted image by applying local image enhancement. Here, the "character noise" means an atypical shaped background noise configured with characters and the like.

According to the character noise eliminating apparatus described above, the character noise area is detected based on the character noise, the density conversion area layer is set inside and outside the character noise area, the reference area is limited to the neighboring pixel group within the same density conversion area layer as the density conversion area layer to which the target pixel belongs, and ridgelines are enhanced by using a local image enhancing method (adaptive histogram equalization or the adaptive contrast stretch), then the character noise is eliminated.

Consequently, fingerprint ridgelines are enhanced and extracted easily. When it is applied to a latent fingerprint, the character noise is eliminated and fingerprint ridgelines with the ridgelines enhanced can be displayed, so that a investigator can identify a fingerprint easily. Further, an image with its character noise eliminated can be used for feature extraction, so that feature quantity can be extracted more accurately, and thereby accuracy of fingerprint matching is improved.

As an another exemplary aspect of the invention, a character noise eliminating method according to the present invention includes: a character noise area detecting step for detecting a character noise area which is an area corresponding to a character noise, from an image; a density conversion area layer determining step for setting a plurality of density conversion area layers inside and outside the character noise area; and a density converting step for, as a reference area of a target pixel, setting a neighboring pixel group within the same density conversion area layer as the density conversion area layer to which the target pixel belongs, and generating a density converted image by applying with local image enhancement; so as to eliminate the character noise.

According to the above character noise eliminating method, the character noise area is detected based on the character noise, and the density conversion area layer is set inside and outside the character noise area, and the reference area is limited to the neighboring pixel group within the same density conversion area layer as the density conversion area layer to which the target pixel belongs, and ridgelines are enhanced with the local image enhancement method, then the character noise is eliminated.

Consequently, fingerprint ridgelines are enhanced and extracted easily. When it is applied to a latent fingerprint, the character noise is eliminated and fingerprint ridgelines with the ridgelines enhanced can be displayed, so that an investigator can identify a fingerprint easily. Further, an image with its character noise eliminated can be used for feature extraction, so that feature quantity can be extracted more accurately, and thereby accuracy of fingerprint matching is improved.

As still another exemplary aspect of the invention, a character noise eliminating program according to the present invention makes a computer execute: a character noise area detecting processing for detecting a character noise area, which is an area corresponding to a character noise, from an image; a density conversion area layer determining processing for setting a plurality of density conversion area layers inside and outside the character noise area; and a density converting processing for, as a reference area of a target pixel, setting a neighboring pixel group within the same density conversion area layer as the density conversion area layer to which the target pixel belongs, and generating a density converted image by applying local image enhancement.

According to the character noise eliminating program above, the character noise area is detected based on the character noise, and the density conversion area layer is set inside and outside the character noise area, and the reference area is limited to the neighboring pixel group within the same density conversion area layer as the density conversion area layer to which the target pixel belongs, and ridgelines are enhanced with the local image enhancement method, then the character noise is eliminated.

Consequently, fingerprint ridgelines are enhanced and extracted easily. When it is applied to a latent fingerprint, the character noise is eliminated and fingerprint ridgelines with the ridgelines enhanced can be displayed, and thereby an investigator can identify a fingerprint easily. Further, an image with its character noise eliminated can be used for feature extraction, so that feature quantity can be extracted more accurately, and thereby accuracy of fingerprint matching is improved.

An exemplary advantage according to the invention is to detect the character noise area based on the character noise, to set the density conversion area layer inside and outside the character noise area, to limit the reference area to the neighboring pixel group within the same density conversion area layer as the density conversion area layer to which the target pixel belongs, to enhance the ridgeline by using the local image enhancement method, so as to eliminate the character noise.

Consequently, fingerprint ridgelines are easily enhanced and extracted. When it is applied to a latent fingerprint, the character noise is eliminated and fingerprint ridgeline with the ridgelines enhanced can be displayed, so that an investigator can identify a fingerprint easily. Further, an image with its character noise extracted can be used for feature extraction, so that feature quantity can be extracted more accurately, and thereby accuracy of fingerprint matching is improved.

DESCRIPTION OF EXEMPLARY EMBODIMENTS

Hereinafter, a configuration and an operation of a fingerprint image enhancing apparatus 10, which is one exemplary embodiment of the present invention, will be explained with reference to the drawings.

(Structure of Fingerprint Image Enhancing Apparatus 10)

Figure 1:
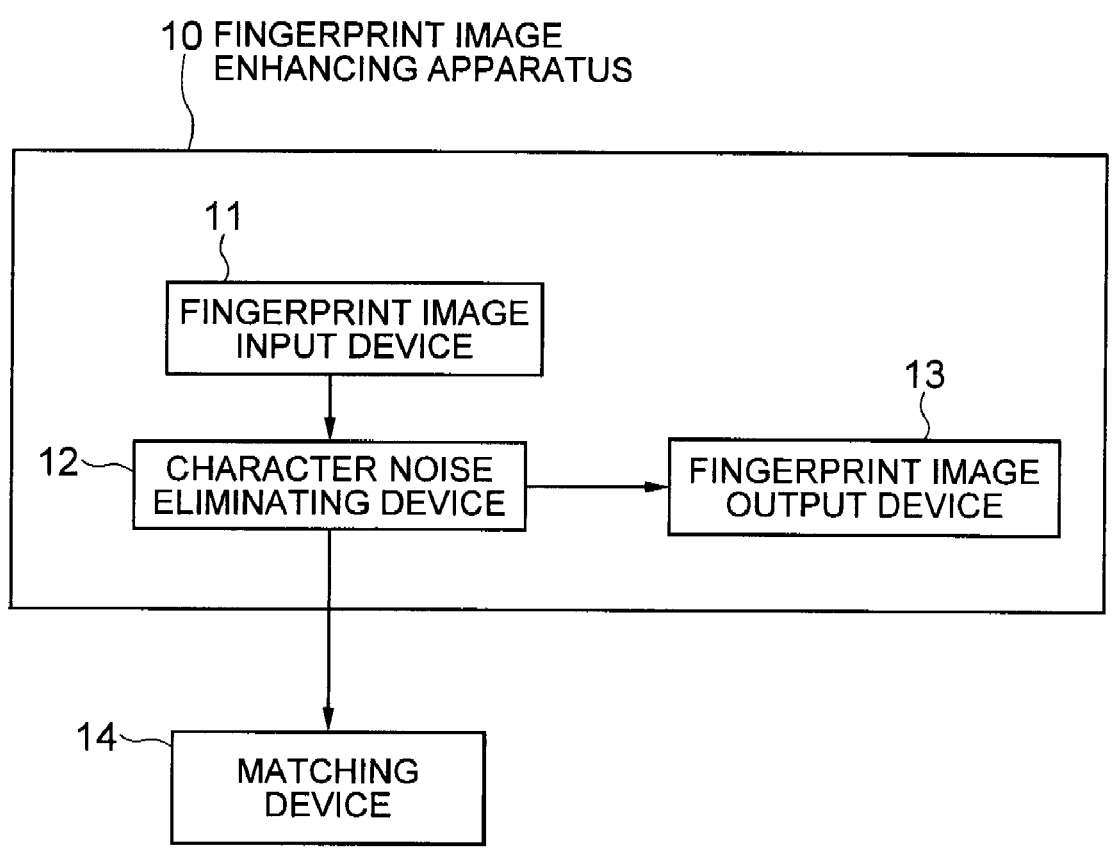
FIG. 1 is an overall block diagram showing a fingerprint image enhancing apparatus which is one exemplary embodiment of the present invention.

FIG. 1 is a functional block diagram for showing a structure of the fingerprint image enhancing apparatus 10.

The fingerprint image enhancing apparatus 10 is, for example, a personal computer, and provided with a fingerprint image input device 11, a character noise eliminating device 12, and a fingerprint image output device 13.

The fingerprint image input device 11 digitizes and inputs fingerprint images that are read out by a sensor or a scanner, for example. Further, the fingerprint image input device 11 may input already-digitized images in a form of file.

The character noise eliminating device 12 has a function of eliminating a character noise from the fingerprint image inputted through the fingerprint image input device 11 and enhancing the ridgeline density.

The fingerprint image output device 13 outputs the fingerprint image processed by the character noise eliminating device 12 to a monitor, a printer, and the like. Further, as a way of example, it is also possible to transmit the fingerprint image processed by the character noise eliminating device 12 directly to a matching device 14 or the like.

Figure 2:
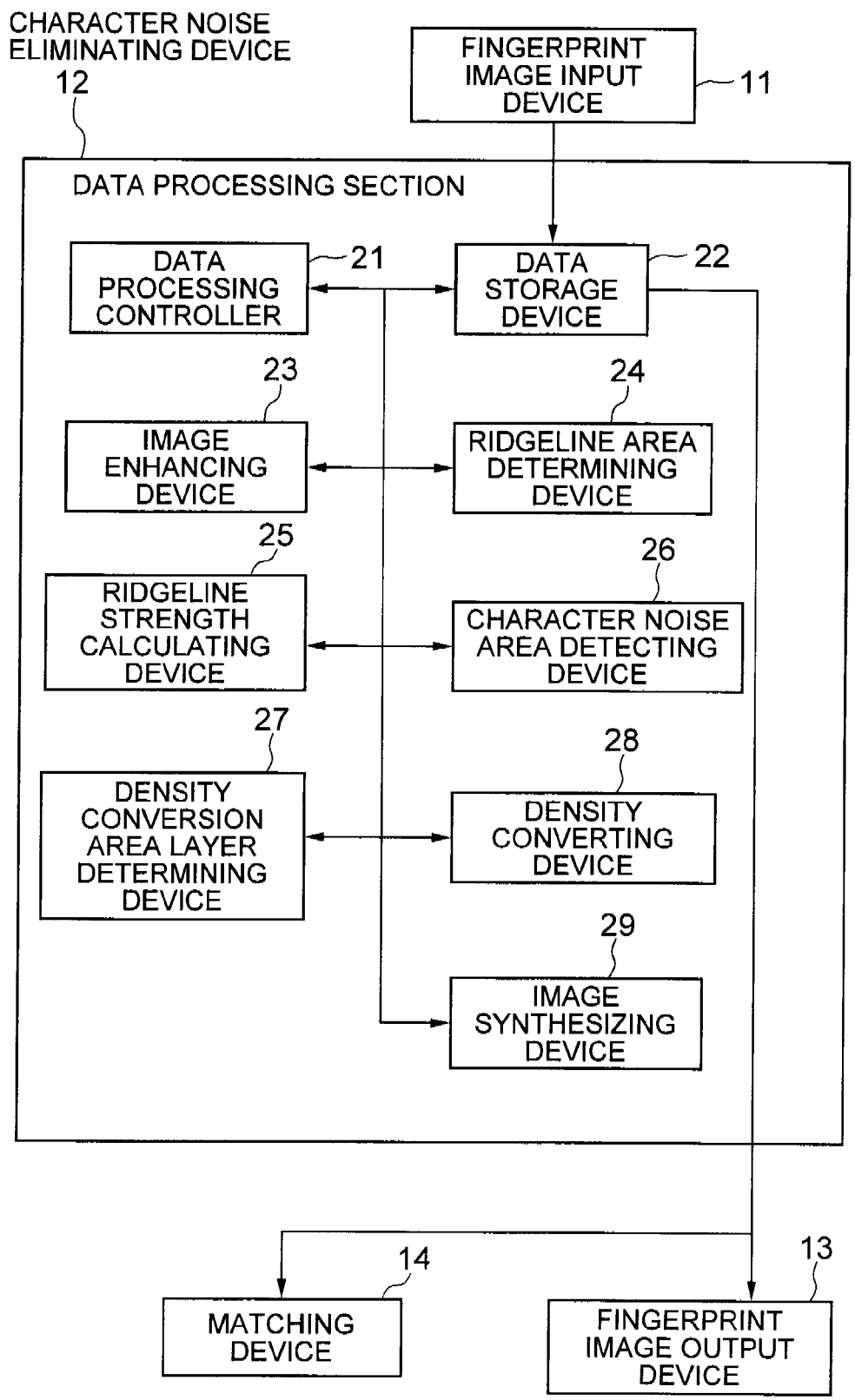
FIG. 2 is a functional block diagram showing a character noise eliminating device in FIG. 1.

FIG. 2 is a functional block diagram for showing the structure of the character noise eliminating device 12.

The character noise eliminating device 12 includes a data processing controller 21, a data storage device (memory device) 22, an image enhancing device 23, a ridgeline area determining device 24, a ridgeline strength calculating device 25, a character noise area detecting device 26, a density conversion area layer determining device 27, a density converting device 28, and an image synthesizing device 29.

The data processing controller 21 controls transmission and reception of data and messages exchanged between each of the devices that compose the character noise eliminating device 12.

The data storage device 22 includes a RAM (Random Access Memory), for example, and each of the aforementioned devices that compose the character noise eliminating device 12 uses it as the work area. Further, it is also used for temporarily storing the information calculated by each device. Furthermore, the data storage device 22 is also used as the work area of each devices such as the image enhancing device 23, the ridgeline area determining device 24, the ridgeline strength calculating device 25, the character noise area detecting device 26, the density conversion area layer determining device 27, the density converting device 28 and the image synthesizing device 29.

The image enhancing device 23 includes a function of enhancing a density of an input image by using the local image enhancement method.

The ridgeline area determining device 24 includes the functions of binarizing the input image with various binary thresholds, calculating a ridgeline area evaluation value from ridgeline strength of the binary image, specifying a ridgeline local area from the ridgeline area evaluation value, and evaluating a black pixel ratio in the local area so as to output the binary image excluding a fingerprint ridgeline component, and besides, including character noise area as much as possible.

The ridgeline strength calculating device 25 includes the function of calculating a reliability of a fingerprint ridgeline based on the input image as ridgeline strength.

The character noise area detecting device 26 includes the functions of analyzing the binary image, eliminating a fingerprint ridgeline component, and registering the remaining area in a character noise area image as a character noise area.

The density conversion area layer determining device 27 includes the functions of determining a plurality of density conversion area layers outside and inside the character noise area, and registering them as density conversion area images.

The density converting device 28 includes the function of converting a pixel density of the density conversion area layer by using the density conversion area image of which the density conversion area layer is registered and the input image by the local image enhancement method with which a neighboring pixel group of the density conversion area layer including the pixel is set as a reference area.

The image synthesizing device 29 includes the function of synthesizing an image enhanced by the image enhancing device 23 and an image converted its density by the density converting device 28, by adopting a smaller density value out of the values of the two images for each pixel in the density conversion area, and by adopting a density value of the enhanced image for each pixel outside the density conversion area, and generating an image from which the character noise is eliminated.

Each device described above can be achieved by a CPU (Central Processing Unit) of the fingerprint image enhancing apparatus 10 executing a computer program to control hardware of the fingerprint image enhancing apparatus 10.

Figure 3:
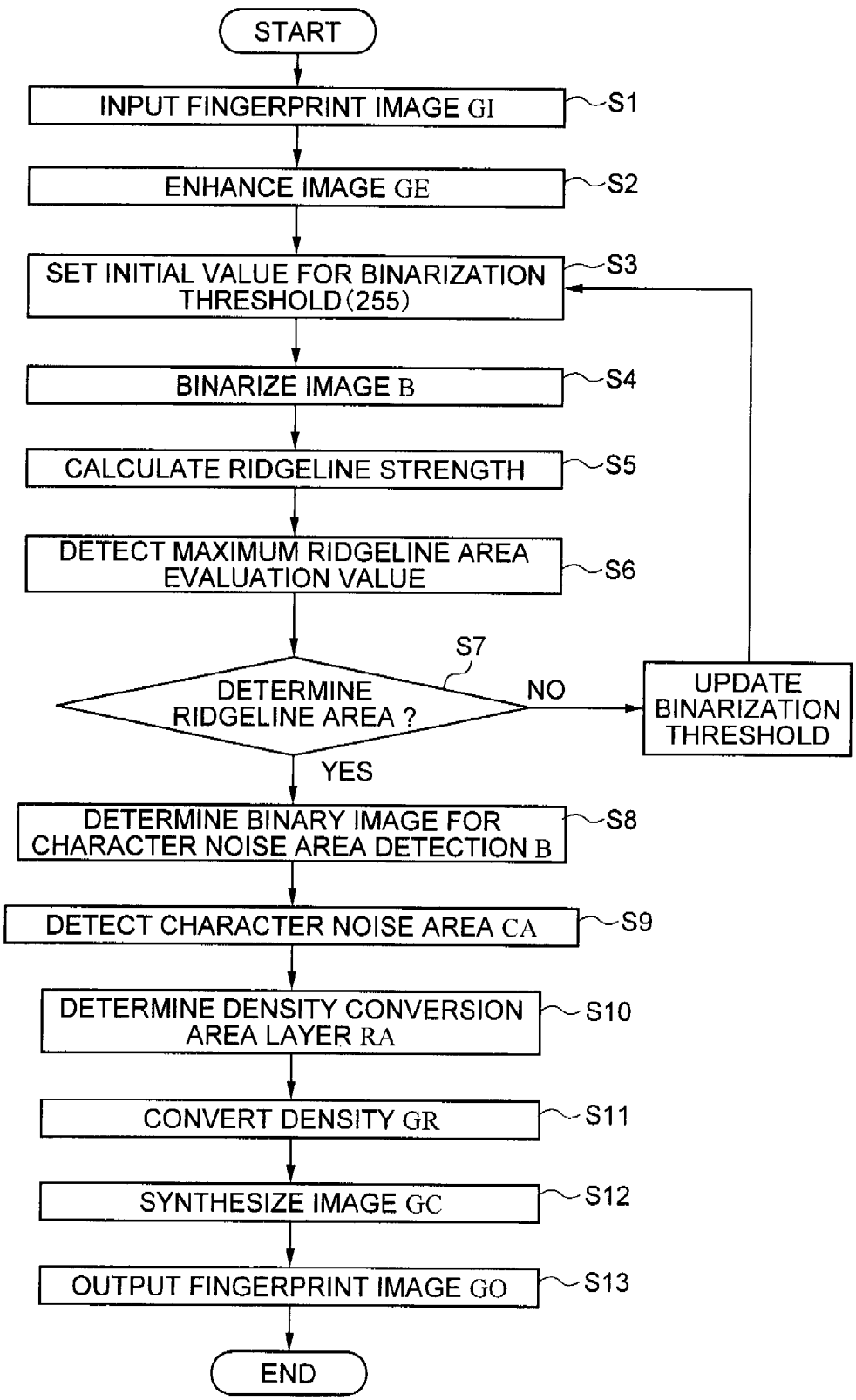
FIG. 3 is a flowchart showing operations of the fingerprint image enhancing apparatus.

FIG. 3 is a flowchart showing the operations of the whole character noise eliminating device 12, the fingerprint image input device 11, and the fingerprint image output device 13.

In Step S1 of FIG. 3, the fingerprint image input device 11 shown in FIG. 2 inputs a fingerprint image. In this step, an image read out by a scanner, for example, is digitized and inputted. Further, it is also possible to input an already-digitized fingerprint image file, as another way of example. The fingerprint image example is expressed as GI, and shown in FIG. 4.

Figure 4:
FIG. 4 is an illustration showing one example of input images.

The examples of the finger print images such as the one shown in FIG. 4 are the images obtained by digitizing the fingerprint images that are read out by a sensor or a scanner. Those fingerprint image examples are digitized with the resolution of 500 dpi according to "ANSI/NIST-ITL-1-2000 Data Format for the Interchange of Fingerprint, Facial, & Scar Mark & Tattoo (SMT) Information" that is standardized by National Institute of Standards and Technology (US). This standardization document can be downloaded from the following URL (as of July, 2006).

ftp://sequoyah.nist.gov/pub/nist_internal_reports/sp500-245-a16.pdf

With the aforementioned standard, the image is digitized to have the density values of two-hundred and fifty-six gradations from 0 to 255. Further, the density values are defined with the luminance standards where the numerical values increase as the luminance becomes higher (brighter). In the exemplary embodiment of the present invention, however, explanations regarding the density values are provided on the basis of the density standards where the numerical values increase as the density becomes higher. Therefore, the ridgeline with high density has the value close to 255 as the maximum value, and the base paper or the valleys with low density has the density value close to 0.

Figure 5:
FIG. 5 is an illustration showing one example of enhanced images which is the input image in FIG. 4 applied an enhancing processing.

Next, in step S2 of FIG. 3, the image enhancing device 23 shown in FIG. 2 enhances the density of the input image and expands the dynamic range of the fingerprint ridgelines. For the enhancing method, the local image enhancement method represented by the adaptive histogram equalization or the adaptive contrast stretch is adopted. Even in an area where the dynamic range of the fingerprint ridgelines is narrow, it is possible to obtain an image that has a uniform contrast change over the entire area through performing enhancement by using the local image enhancement method. Size setting of the reference area is important with the local image enhancement method. It is set in this case as a circle with a radius of about fifteen pixels. The average pitch between the ridgelines of the fingerprint is about ten pixels (the actual distance is 0.5 mm), so that it is appropriate to set the circle with the radius of about 1.5 times the average ridgeline pitch as the minimum area that includes the contrast change of the ridgeline. FIG. 5 shows an image that is obtained by applying the above-described processing to enhance the input image of FIG. 4. This fingerprint image is expressed as GE. It can be seen from FIG. 5 that both the area with high background density and the area with low background area density are enhanced uniformly.

The processing hereinafter is broadly separated into two. The first-half processing is the processing from step S3 to step S8 of FIG. 3, in which a binary image necessary for detection of a character noise area is generated. The latter-half processing is the processing from Step S9 to Step S13 in FIG. 3, in which the character noise area is detected, and then a density of pixels in the character noise area is converted to generate a character noise eliminated image.

Here, a reason why the binary image is generated for detecting the character noise area will be explained. In general, it can be assumed that a density value of an area having a character noise is larger than a density value of a neighboring fingerprint ridgeline part (area with no character noise). If the character noise area has smaller density value than the neighboring fingerprint ridgeline part, character noise elimination is not important at all because the character noise area affects the ridgeline extraction only in a limited way. Accordingly, a target is a case with a fingerprint image where the density value of the character noise area is larger than the density value of the neighboring fingerprint ridgeline part.

Figure 6A:
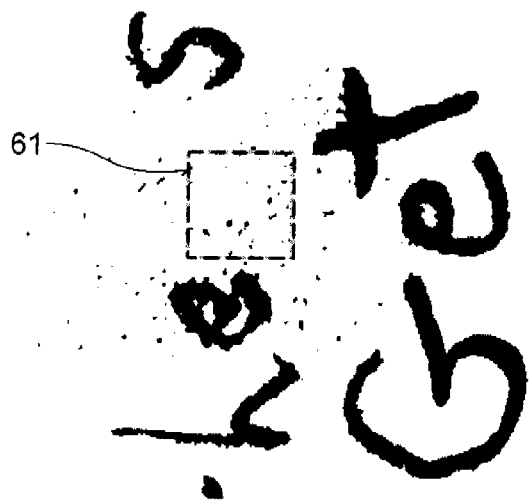
FIGS. 6A, 6B, and 6C are illustrations showing examples of binary images each of which is an input image in FIG. 4 binarized with different binarization thresholds.
Figure 6B:
Figure 6C:

The binary image used here is generated by simply binarizing an input image with some binarization threshold. In this case, when the binarization threshold becomes smaller, the region where a character noise area can be detected becomes wider, but on the other hand, a fingerprint ridgeline part can be also extracted easier. This example will be explained with reference to FIG. 6. FIG. 6A, 6B, 6C show images which are generated by binarizing the input image in FIG. 4 with three kinds of binarization thresholds. In FIG. 6A, the binarization threshold value is large, so that the fingerprint ridgeline can be seldom distinguished. In contrast, in FIG. 6C, the binarization threshold value is small, so that an area in which the fingerprint ridgeline can be easily distinguished is emerged.

The target of this processing is generating a binary image in which extraction of a fingerprint ridgeline part can be limited at minimum and, at the same time, a character area can be detected in a possibly wider region. In order to satisfy the above conditions, a minimum binarization threshold with which the extraction of the fingerprint ridgeline can be limited at minimum (an optimal binarization threshold) is required to be found out.

Therefore, binary images are generated by decreasing the values of the binarization thresholds bit by bit from the maximum value, ridgeline strength is calculated based on the binary images, and when a ridgeline is detected in a local area of a certain area, the processing is finished and a binarization threshold 1 is determined. Next, a binary image which is generated with a binarization threshold larger than the determined binarization threshold 1 is analyzed, and, in a local area detected as a ridgeline area, a minimum binarization threshold t with which a ratio of pixels converted into a black pixel is smaller than a prescribed threshold (for example, 10%) is determined. A binary image binarized with this binarization threshold t is the target binary image.

In Step 3 of FIG. 3, the ridgeline area determining device 24 in FIG. 2 sets an initial value for the binarization threshold at the maximum value, 255, and the process moves to Step 4 in FIG. 3. In Step 4, the ridgeline area determining device 24 in FIG. 2 simply converts the input image into a binary image having black and white with the binarization threshold specified in this processing. That is, when a density value is larger than the binarization threshold, a pixel is converted into a black pixel, and when a case is other than the above, a pixel is converted into a white pixel. Images are shown in FIG. 6 which are the input images GI in FIG. 4 binarized with three binarization thresholds of 185, 175 and 165. The binary images are expressed as B, or such as B(185), appending the binarization threshold.

Next, in Step S5 of FIG. 3, the ridgeline strength calculating device 25 in FIG. 2 calculates ridgeline strength based on the binary images. A method for calculating the ridgeline strength or ridgeline reliability can be realized with a related art. For example, according to a related art disclosed in JP 2002-288641 (Funada), two-dimensional Fourier transformation is performed in a local area, and the ridgeline strength is calculated on the basis of a power near a peak in a Fourier transformation surface obtained as a result of the above described transformation.

Further, according to a related art shown in JP 52-97298 (Asai), a ridgeline direction and reliability of a fingerprint is extracted as follows. A streak pattern image has small contrast variations in a same direction with the streak pattern, and has large contrast variations in a direction perpendicular to the streak pattern, which is utilized for obtaining an extreme value of contrast variation amount with respect to a plurality of prescribed quantization directions, and determining a streak pattern direction from the extreme value. Next, the reliability (strength) of the direction is calculated on the basis of the contrast variation amount in a direction perpendicular to the extracted direction.

In this regard, the above described related art is recited based on the gray-scale image, however, the ridgeline strength can be calculated by using the binary image instead of the gray-scale image.

The ridgeline area determining device 24 in FIG. 2 registers the ridgeline strength calculated as above in a memory as a ridgeline strength image.

Next, in Step S6 of FIG. 3, the ridgeline area determining device 24 in FIG. 2 analyses the ridgeline strength image and calculates a ridgeline area evaluation value. Specifically, a local area including about 64*64 pixels is set, and an average value of the ridgeline strength of each pixel in the local area is calculated to be the ridgeline area evaluation value. Next, this local area setting is applied to the entire image, and the ridgeline area evaluation values are calculated at each local area, then a maximum ridgeline area evaluation value among them is determined as the ridgeline area evaluation value of the image.

The rectangular dotted lines with numeral 63 in FIG. 6C shows a local area having the maximum ridgeline area evaluation value in the binary image B(165). This area has the largest reliability as a fingerprint ridgeline in the entire image. Numerals 61 and 62 in FIGS. 6A and 6B show the same local area as the numeral 63. The ridgeline area evaluation value of the local area 61 in the binary image B(185) is nearly 0 because the ridgeline cannot be distinguished. The ridgeline area evaluation value of the local area 62 in the binary image B(175) becomes smaller than the one of the local area 61 in B(165).

Next, in Step S7 of FIG. 3, the ridgeline area determining device 24 in FIG. 2 determines whether the maximum ridgeline area evaluation value is under the prescribed threshold or not. If it is under the threshold, the binarization threshold is lowered and the process returns to Step S4. The binarization threshold may be lowered one by one from the maximum value of 255, or may be lowered by two or more. When this pitch becomes smaller, the binary image can be generated more accurately, but on the other hand, the processing takes more time, so that an appropriate pitch may be determined considering performance of a computer, etc. to be used.

When the maximum ridgeline area evaluation value is more than or equal to the prescribed threshold, it can be determined that the ridgeline area can be recognized based on the binary image in this processing, so that the binarization threshold 1 and the local area having the maximum ridgeline area evaluation value are registered in a memory, and the processing moves to Step S8 in FIG. 3.

For example, when three of the binary images B(185), B(175), B(165) are evaluated in this order, and the ridgeline area evaluation value of the local area 61 becomes greater than or equal to the threshold at B(165) first time, then the binarization threshold 1 is to be 165.

Next, in Step S8 of FIG. 3, the ridgeline area determining device 24 in FIG. 2 analyzes and evaluates the binary images binarized with a larger threshold than the binarization threshold 1, and determines a binary image in which a fingerprint ridgeline part is seldom binarized. In the present exemplary embodiment, a black pixel ratio in a local area having the maximum ridgeline area evaluation value in Step S6 of FIG. 3 can be utilized for this analysis and evaluation.

When the binary images of B(185), B(175), and B(165) in FIG. 6 are taken as examples, and if the ridgeline area evaluation value is equal to or more than the threshold in the local area 62 in the binary image B(175) because the ridgeline part is binarized in some extent, and the evaluation value is less than the threshold because the ridgeline part is seldom binarized in the local area 61 in the binary image B(185), then the binarized threshold t becomes 185. Therefore, the binary image to be analyzed for the character noise thereof is determined as B(185), and which is registered in a memory.

Next, in Step S9 of FIG. 3, the character noise area detecting device 26 in FIG. 2 analyzes the binary image outputted in Step S7 mentioned above, and eliminates the fingerprint ridgeline component, then extracts remaining area as the character noise area so as to register it in the memory as the character noise area image CA.

This binary image includes the character noise area, but on the other hand, a fingerprint ridgeline part also remains therein. However, the fingerprint ridgeline part remaining therein is such as the one shown in the binary image B(185) in FIG. 6A, which does not have enough length or width as a ridgeline. Accordingly, it can be eliminated with a simple logic. For example, a logic of eliminating an independent black pixel area having the maximum length of under about 6 pixels and a logic of eliminating a center pixel in a case where a black pixel ratio is determined to be under 50% after examining a neighboring pixel group with about a 4 pixel radius centering some black pixel, may be combined.

Figure 7:
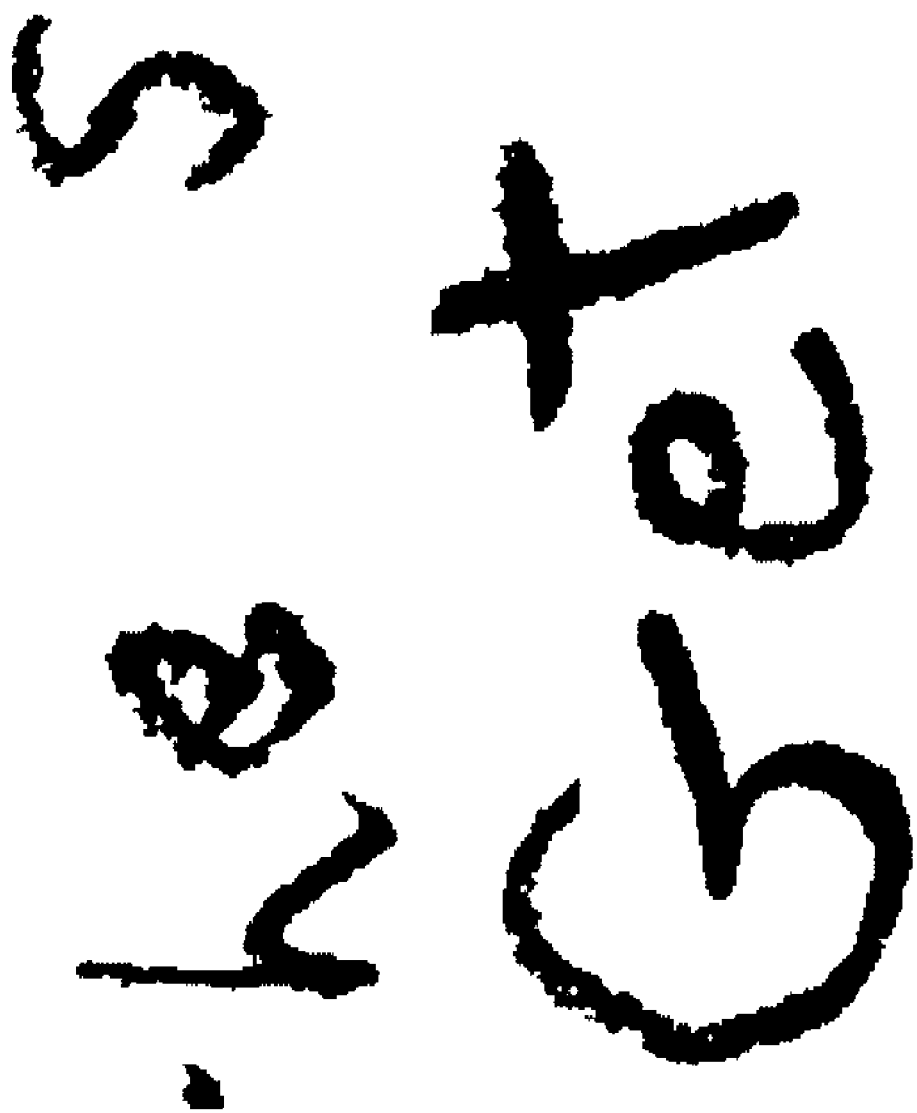
FIG. 7 is an illustration showing one example of character noise area images extracted from the binary image.

The character noise area image CA in which the ridgeline component is eliminated and only the character noise area remains as described above is shown in FIG. 7. Compared to B(185) in FIG. 6A, CA in FIG. 7 shows that the ridgeline component is eliminated therefrom.

Next, in Step S10 of FIG. 3, the density conversion area layer determining deice 27 in FIG. 2 determines a plurality of area layers outside and inside the character noise area in a character noise area image LC, and registers it in the memory as a density conversion area image RA.

Firstly, the density conversion area is not set only inside the character noise area, but also set outside thereof. The reason is that some pixels outside the character noise area have higher background densities in many cases because of influence of the character noise area. It is considered that this phenomenon occurs due to the blur of the ink in the vicinity of the edges (boundaries) of the noise or due to the influence of the sensitivity of the sensor. Accordingly, some pixels outside the character noise area are to be targets for density conversion.

Figure 9A:
FIG. 9A is a partially enlarged illustration of an input image in FIG. 4.
Figure 9B:
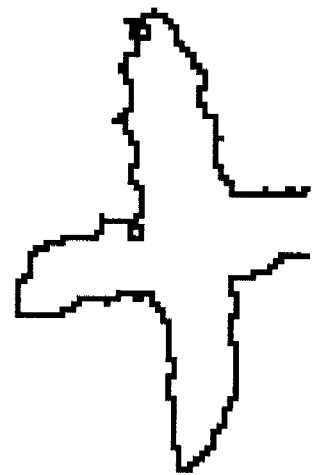
FIG. 9B is an illustration describing an edge layer of the character noise area.
Figure 9C:
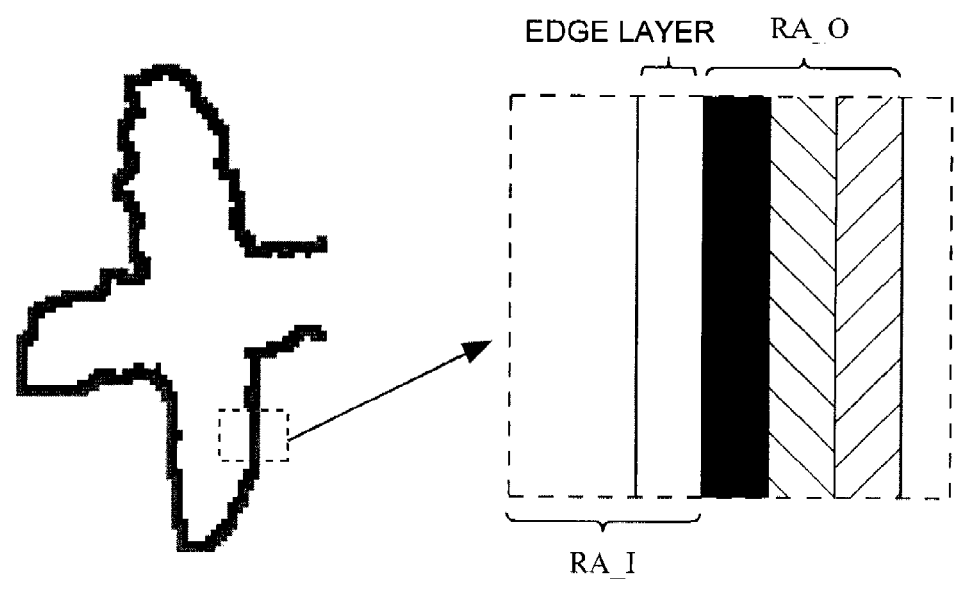
FIG. 9C is an illustration describing a conversion area layer outside the character noise area.
Figure 10:
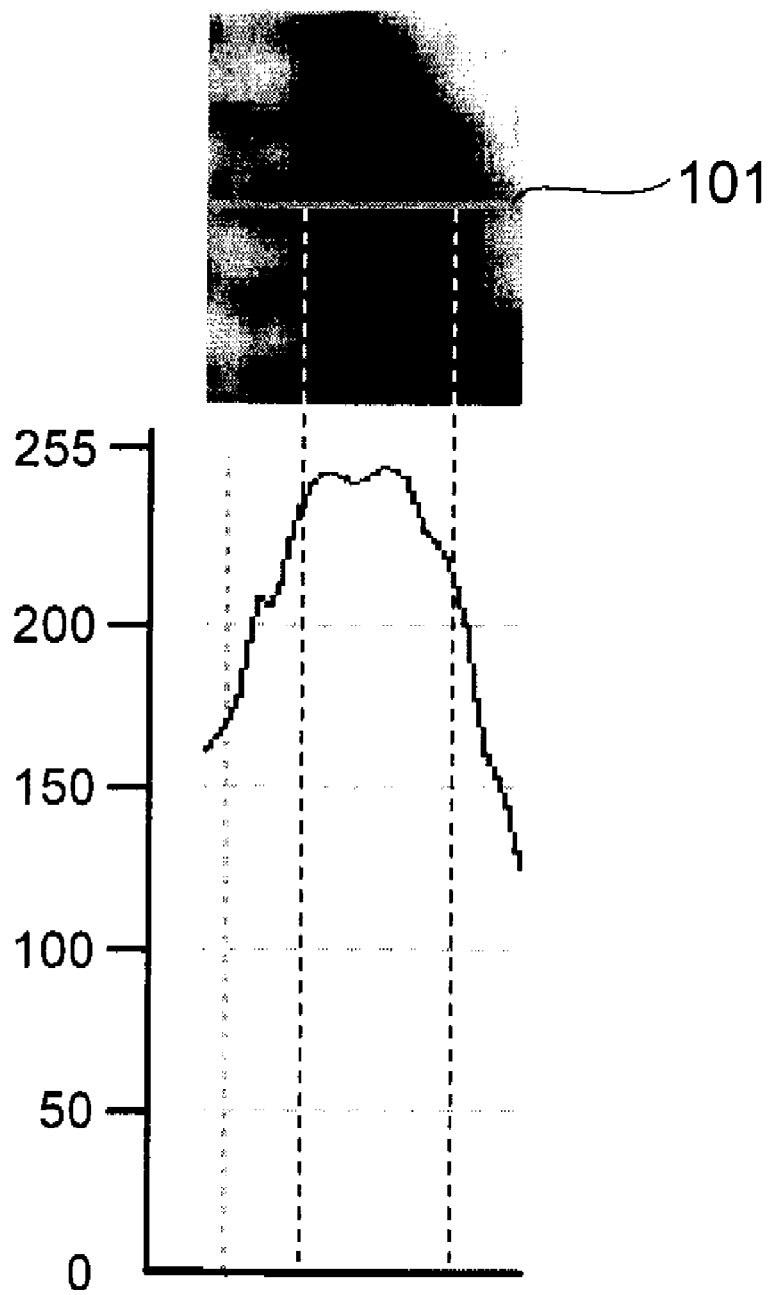
FIG. 10 is an illustration showing a density profile of a character noise area neighborhood.

Next, the reason why the density conversion area layer is set will be explained. The background density outside the character noise area tends to be low gradually from the edge of the character noise area toward outside. Similarly, the background density within the character noise area tends to be high gradually from the edge of the character noise area toward inside. This example will be explained with reference to FIGS. 9 and 10. FIG. 9A is an enlarged view of the input image and it includes the character noise area. FIG. 10 is a density profile of a pixel group in a horizontal direction, shown in 101, for a part area of FIG. 9A. In FIG. 10, the tops of the dotted lines show edge pixels of the area extracted as the character noise. According to the density profile, the density near the edges of the character area do not vary drastically, but gradually decreases for some pixels from the edge toward outside. Also, the densities are not even inside the edge, and the density gradually increases for some pixels toward inside.

Therefore, if the area with varying background densities is enhanced as one reference area with the local image enhancement method, an enhancement result is not even. Namely, if the method is applied to the character noise area, a center part of the character noise is converted into a higher density value relatively, and an edge neighborhood is converted into a lower density value relatively, and thereby noise elimination is not effective.

To solve the above described problem, a plurality of density conversion area layers is set near the edge of the noise area. If the noise background densities at each density conversion area layer are even, it can be expected that the character noise component is eliminated from an image which is converted its density with the local image enhancement taking only the layer as a reference area.

Figure 8A:
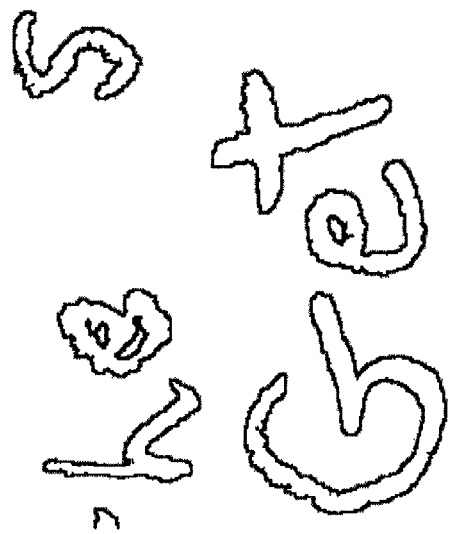
FIG. 8A is an illustration showing one example of a density conversion area layers outside the character noise area.
Figure 8B:
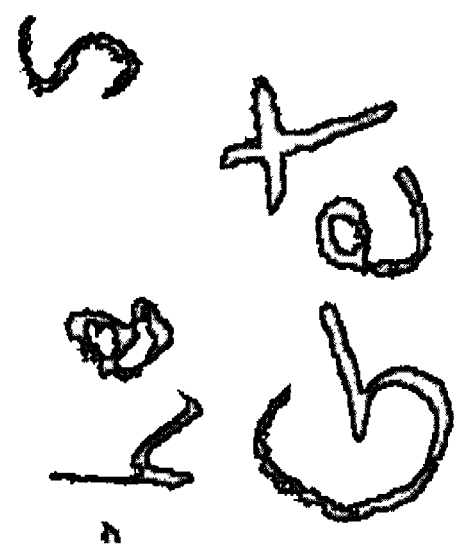
FIG. 8B is an illustration showing one example of density conversion layers inside the character noise area.

So, a character noise area edge is detected so as to set a plurality of layers having one pixel unit outside and inside thereof. In this exemplary embodiment, three outside layers and four inside layers (including an edge layer) are set as conversion layers. This example is shown in FIGS. 8A and 8B. FIG. 8A shows a density conversion area layer outside the character noise area, which is expressed as RA_O. FIG. 8B shows a density conversion area layer inside the character noise area, which is expressed as RA_I.

Next, a relationship between the edge and the area layer will be explained with reference to FIG. 9. FIG. 9B shows an image showing the edge layer of the character noise area, corresponding to FIG. 9A. Also, FIG. 9C shows the density conversion area layer RA_O outside the character noise area, corresponding to FIG. 9A. According to FIG. 9C, three of the density conversion area layers are defined as one pixel unit outside the edge layer in FIG. 9B.

Next, in Step S11 of FIG. 3, the density converting device 28 in FIG. 2 converts the density of the input image GI with the local image enhancement method, limiting to a pixel in the density conversion area layer. A reference area for the local image enhancement method is to be a neighboring pixel group (a range is within about 16 pixels) included in the density conversion area layer to which the pixel belongs. As described above, density conversion is performed only for the neighboring pixel group in which pixels have similar noise densities, and thereby it is expected that the character noise component is eliminated from the density converted image.

The local image enhancement method utilized in this density conversion is equivalent to the local image enhancement method utilized in Step S2.

Figure 11:
FIG. 11 is an illustration showing one example of density converted images.

FIG. 11 is a fingerprint image generated by performing the density conversion on the character noise area in FIG. 9A, and is expressed as GR. Comparing FIG. 11 to FIG. 9A, the character noise components almost disappears and the fingerprint ridgelines are enhanced.

Figure 12:
FIG. 12 is an illustration showing one example of synthetic images.
Figure 13:
FIG. 13 is an illustration showing one example of noise elimination results with a related art based on Fourier transformation.
Figure 14A:
FIG. 14A is an illustration showing one example of noise elimination results by a related method, adaptive histogram equalization.
Figure 14B:
FIG. 14B is an illustration showing one example of noise elimination results by a related neighborhood density replacement.

Next, in Step S12 of FIG. 3, the image synthesizing device 29 in FIG. 2 generates a synthetic image GC from which the character noise is eliminated, based on the image GE in which the character noise is enhanced in Step S2 and the image GR performed density conversion in Step S11. Regarding the synthesizing method of the exemplary embodiment, a smaller density value among the density values of GE and GR is adopted with respect to each pixel in the density conversion area, and the density value of the enhanced image GE is adopted with respect to each pixel outside the density conversion area. The reason is that the density value of an image from which the character noise is eliminated becomes small usually. FIG. 12 is an image synthesized as described above. According to it, the character noise components disappear, and only the fingerprint ridgelines are enhanced.

Next, in Step S13 of FIG. 3, the image GO in which the character noises are eliminated and the ridgelines are enhanced is outputted. This image GO is equivalent to the synthetic image GC in this exemplary embodiment. In addition to a monitor and a printer, a matching device and a feature extracting device are also considered as the output destinations.

This example has been described by referring to the case of fingerprint images. However, another example of the present invention can also be applied effectively to palm print images that have the similar patterns as those of the fingerprints. When the exemplary aspect of the present invention is applied to the palm print image, it is possible to eliminate the character noises effectively through setting the reference area within about a 20 pixels range, since the average ridgeline pitch of the palm print is wider by about 25% than that of the fingerprint.

Further, when it is assumed that the character noise density is not even in the entire image and is partially varied, the character noise elimination may be performed by dividing the entire image into several areas. Each area is set in a size in which the density of the character noise area is assumed to be even. By generating images from which the character noise is eliminated with a method of the exemplary embodiment at each area, and synthesizing them as the entire area at last, the character noise can be eliminated even if the character noise density is not even in the entire image.

Next, effect of the fingerprint image enhancing apparatus 10 will be explained.

According to the present invention, the character noise is eliminated by detecting the character noise area based on an atypical background noise such as characters (a character noise), setting the density conversion area layer inside and outside the character noise area, and enhancing ridgelines by using the local image enhancement method (adaptive histogram equalization method or adaptive contrast stretch method) with limiting a reference area to the same density conversion area layer.

As a result, enhancement and extraction of the fingerprint ridgelines can be achieved easily. When it is applied to the latent fingerprint, it is possible to display the enhanced fingerprint ridgelines with the character noise being eliminated. Thus, it helps the investigator to make a judgment easily. Further, feature extraction can be performed by using the image from which the character noise is eliminated, so that more accurate feature quantity can be extracted. As a result, the accuracy of fingerprint matching is improved as well.

The part outside the noise area of the image is enhanced by the method equivalent to the local image enhancement method which is used for converting the density inside the noise area. Through this, there is generated a noise-eliminated image in which the density levels inside and outside the noise area are equalized.

When it is applied to a fingerprint image, the character noise can be eliminated effectively by limiting a reference area to a neighboring pixel group within about a 15 pixels range. The fingerprint ridgelines have the average ridgeline pitch of ten pixels (0.5 mm in actual distance), so that a distance of about 1.5 times as long as the average ridge width is considered rational as the minimum distance that includes the fluctuation of the crossing fingerprint ridgelines that are tilted to intersect some extent.

When it is applied to the palm print image, the distance may be set as about 20 pixels, since the ridgeline pitch of the palm print is wider by 25% than that of the fingerprint.

For detecting a character noise area from a fingerprint image, analyzing a binary image binarized with a plurality of binarization thresholds, calculating a ridgeline area evaluation value of a local area at each of the binary images, specifying a local area and a maximum value of the binarization thresholds which generate a binary image with which a maximum ridgeline area evaluation value in the entire images is to be a prescribed threshold or more, analyzing an image which is binarized with a threshold larger than the specified binarization threshold, and specifying an image binarized with a minimum binarization threshold which is the minimum threshold needed to generate a binary image having a ratio of binarized fingerprint ridgelines (a black pixel ratio) smaller than a prescribed threshold (for example 10%) in the specified local area, and then an independent small area (a maximum length is short) is eliminated from the specified binary image. Finally, the character noise area is detected.

In the character area detected as described above, the risk of including a fingerprint ridgeline part is decreased, so the risk of eliminating the fingerprint ridgeline part mistakenly is also decreased.

Next, another exemplary embodiment of the present invention will be explained.

In the character noise eliminating apparatus described above, the density converting device may set a neighboring pixel group within the same density conversion area layer as the density conversion area layer to which a target pixel belongs as a reference area, which is within a range from the target pixel about 1.5 times of pixel numbers corresponding to an average ridgeline pitch of a fingerprint or a palm print. The "ridgeline pitch" is a distance (pitch) between each of the centers of the neighboring ridgelines.

In this way, a distance between the reference area and the target pixel is limited to the neighboring area, which is a minimum range needed to include the fingerprint ridgeline variations intersecting diagonally in some extent, so that the character noise can be eliminated effectively. In this regard, an average ridgeline pitch is 0.5 mm in actual distance, so that the pixel numbers corresponding to 1.5 times of the average ridgeline pitch is about 15 pixels in a case with a 500 dpi image resolution. When it comes to a palm print, it is about 20 pixels with which the range is longer than the above case by 25%.

According to the character noise eliminating apparatus in the above, the character noise area detecting device may detect the character noise area by obtaining the optimal binarization threshold with which an image is binarized such that the image has a local area where ridgeline strength is to be a prescribed ridgeline strength threshold or more, and where a black pixel ratio which is a rate of a fingerprint ridgeline part binarized into a black pixel is smaller than a prescribed black pixel ratio threshold, and eliminating an independent small area from an optimal binary image which is the image binarized with the optimal binarization threshold.

In the character area detected as described above, the risk of including a fingerprint ridgeline part is decreased, so the risk of eliminating the fingerprint ridgeline part mistakenly is also decreased.

In the character noise eliminating apparatus described above, the character noise area detecting device may analyze a plurality of binary images obtained by binarizing an image with a plurality of binarization thresholds, calculate a ridgeline area evaluation value of a local area at each binary image, specify a local area and a maximum value of the binarization thresholds with which a maximum ridgeline area evaluation value in the entire binary images is to be a prescribed evaluation threshold value or more, specify a binary image from a plurality of binary images which is binarized with a binarization threshold larger than the maximum binarization threshold and in which a black pixel ratio is smaller than a black pixel ratio threshold at a specified local area, and take a minimum binarization threshold among the binarization thresholds used for generating the specified binary image as an optimal binarization threshold.

In the character area detected as described above, the risk of including a fingerprint ridgeline part is decreased, so the risk of eliminating the fingerprint ridgeline part mistakenly is also decreased.

The character noise eliminating apparatus described above may include an image enhancing device for applying a local image enhancement to an image so as to generate an enhanced image, and an image synthesizing device for generating a synthetic image by synthesizing the enhanced image and the density converted image, taking a smaller density value among density values of the enhanced image and the density converted image as the density value of a pixel included in a density conversion area, and taking the density value of the enhanced image as the density value of a pixel outside the density conversion area, and the local image enhancement may be performed by the density converting device and the image enhancing device in a same manner as described above.

According to the above, a synthetic image can be generated in which density levels are even inside and outside the character noise area.

According to the character noise eliminating apparatus described above, the image may be an entire image divided into a plurality of partial images depending on character noise densities, and the density converted image or the synthetic image generated for each partial image may be synthesized for generating a density converted image or a synthetic image for the entire image.

According to the above, the character noise can be eliminated even if the character noise density is not even in the entire image but varies partially.

The character noise eliminating method may include a density converting step for setting a neighboring pixel group within the same density conversion area layer as the density conversion area layer to which a target pixel belongs as a reference area, which is within a range from the target pixel about 1.5 times of pixel numbers corresponding to an average ridgeline pitch of a fingerprint or a palm print.

In this way, a distance between the reference area and the target pixel is limited to the neighboring area, which is a minimum range needed to include the fingerprint ridgeline variations intersecting diagonally in some extent, so that the character noise can be eliminated effectively.

The noise eliminating method may include the character noise area detecting step for detecting the character noise area by obtaining the optimal binarization threshold with which an image is binarized such that the image has a local area where ridgeline strength is to be a prescribed ridgeline strength threshold or more, and where a black pixel ratio which is a rate of a fingerprint ridgeline part binarized into a black pixel is smaller than a prescribed black pixel ratio threshold, and eliminating an independent small area from an optimal binary image which is the image binarized with the optimal binarization threshold.

In the character noise area detected as described above, the risk of including a fingerprint ridgeline part is decreased, so the risk of eliminating the fingerprint ridgeline part mistakenly is also decreased.

The character noise eliminating method may include a character noise area detecting step for analyzing a plurality of binary images obtained by binarizing an image with a plurality of binarization thresholds, calculating a ridgeline area evaluation value of a local area at each binary image, specifying a local area and a maximum value of the binarization thresholds with which a maximum ridgeline area evaluation value in the entire binary images is to be a prescribed evaluation threshold value or more, specifying a binary image from a plurality of binary images which is binarized with a binarization threshold larger than the maximum binarization threshold and in which a black pixel ratio is smaller than a black pixel ratio threshold at a specified local area, and setting a minimum binarization threshold among the binarization thresholds used for generating the specified binary image as an optimal binarization threshold.

In the character noise area detected as described above, the risk of including a fingerprint ridgeline part is decreased, so the risk of eliminating the fingerprint ridgeline part mistakenly is also decreased.

The character noise eliminating method described above may include an image enhancing step for generating an enhanced image applying a local image enhancement to an image, and an image synthesizing step for generating a synthetic image by synthesizing an enhanced image and a density converted image, taking a smaller density value among density values of the enhanced image and the density converted image as the density value of a pixel included in a density conversion area layer, and taking the density value of the enhanced image as the density value of a pixel outside the density conversion area layer, wherein the local image enhancement is performed in a density converting step and an image enhancing step in a same manner.

According to the above, a synthetic image can be generated in which density levels are even inside and outside the character noise area.

In the above character noise eliminating method, the image may be an entire image divided into a plurality of partial images depending on character noise densities, and a density converted image or a synthetic image generated for each partial image may be synthesized for generating the density converted image or the synthetic image for the entire image.

According to the above, the character noise can be eliminated even if the character noise density is not even in the entire image but varies partially.

The character noise eliminating program may include a density converting processing for setting a neighboring pixel group within the same density conversion area layer as the density conversion area layer to which a target pixel belongs as a reference area, which is within a range from the target pixel about 1.5 times of pixel numbers corresponding to an average ridgeline pitch of a fingerprint or a palm print.

In this way, a distance between the reference area and the target pixel is limited to the neighboring area, which is a minimum range needed to include the fingerprint ridgeline variations intersecting diagonally in some extent, so that the character noise can be eliminated effectively.

The character noise eliminating program described above may include a character noise area detecting processing for detecting the character noise area by obtaining the optimal binarization threshold with which an image is binarized such that the image has a local area where ridgeline strength is to be a prescribed ridgeline strength threshold or more, and where a black pixel ratio which is a rate of a fingerprint ridgeline part binarized into a black pixel is smaller than a prescribed black pixel ratio threshold, and eliminating an independent small area from an optimal binary image which is the image binarized with the optimal binarization threshold.

In the character noise area detected as described above, the risk of including a fingerprint ridgeline part is decreased, so the risk of eliminating the fingerprint ridgeline part mistakenly is also decreased.

The character noise eliminating program described above may include a character noise area detecting processing for analyzing a plurality of binary images obtained by binarizing an image with a plurality of binarization thresholds, calculating a ridgeline area evaluation value of a local area at each binary image, specifying a local area and a maximum value of the binarization thresholds with which a maximum ridgeline area evaluation value in the entire binary images is to be a prescribed evaluation threshold value or more, specifying a binary image from a plurality of binary images which is binarized with a binarization threshold larger than the maximum binarization threshold and in which a black pixel ratio is smaller than a black pixel ratio threshold at a specified local area, and setting a minimum binarization threshold among the binarization thresholds used for generating the specified binary image as an optimal binarization threshold.

In the character noise area detected as described above, the risk of including a fingerprint ridgeline part is decreased, so the risk of eliminating the fingerprint ridgeline part mistakenly is also decreased.

The noise eliminating program described above may make a computer execute an image enhancing processing for generating an enhanced image by applying a local image enhancement to an image, and an image synthesizing processing for generate a synthetic image by synthesizing an enhanced image and a density converted image, taking a smaller density value among density values of the enhanced image and the density converted image as the density value of a pixel in a density conversion area, and taking the density value of the enhanced image as the density value of a pixel outside the density conversion area, wherein the local image enhancement is performed in the density converting processing and the image enhancing processing in a same manner.

According to the above, a synthetic image can be generated in which density levels are even inside and outside the character noise area.

In the above character noise eliminating program, the image is an entire image divided into a plurality of partial images, and the program may make a computer execute a process for generating a density converted image or a synthetic image for each partial image so as to synthesize the density converted image or the synthetic image for the entire image.

According to the above, the character noise can be eliminated even if the character noise density is not even in the entire image but varies partially.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A character noise eliminating apparatus for eliminating a character noise which is an atypical shaped background noise from a fingerprint or a palm print image, the apparatus comprising:
   a character noise area detecting device for detecting a character noise area, which is an area corresponding to the character noise, from the image;
   a density conversion area layer determining device for setting a plurality of density conversion area layers inside and outside the character noise area;
   a density converting device for, as a reference area of a target pixel, setting a neighboring pixel group within the same density conversion area layer as the density conversion area layer to which the target pixel belongs, and generating a density converted image by applying local image enhancement;
   an image enhancing device for generating an enhanced image by applying a local image enhancement to the image; and
   an image synthesizing device for generating a synthetic image by synthesizing the enhanced image and the density converted image taking a smaller density value among two density values of the enhanced image and the density converted image as the density value of a pixel in the density conversion area layer, and taking the density value of the enhanced image as the density value of a pixel outside the density conversion area layer;
   wherein the density converting device and the image enhancing device perform the local image enhancement in a same matter.

2. The character noise eliminating apparatus as claimed in claim 1, wherein the density converting device sets a neighboring pixel group within the same density conversion area layer as the density conversion area layer to which the target pixel belongs as the reference area, which is within a range from the target pixel about 1.5 times of pixel numbers corresponding to an average ridgeline pitch of a fingerprint or a palm print.

3. The character noise eliminating apparatus as claimed in claim 1, wherein the character noise area detecting device detects the character noise area by obtaining an optimal binarization threshold with which the image is binarized such that the image has a local area where ridgeline strength is to be a prescribed ridgeline strength threshold or more, and where a black pixel ratio which is a rate of a fingerprint ridgeline part binarized into a black pixel is smaller than a prescribed black pixel ratio threshold, and eliminating an independent black pixel area with less than a certain size as a ridgeline component from an optimal binary image which is the image binarized with the optimal binarization threshold.

4. The character noise eliminating apparatus as claimed in claim 3, wherein the character noise area detecting device analyzes a plurality of binary images obtained by binarizing the image with a plurality of binarization thresholds, calculates a ridgeline area evaluation value of a local area at each binary image, specifies the local area and a maximum value of the binarization thresholds with which a maximum ridgeline area evaluation value for the entire binary images is to be a prescribed evaluation value threshold or more, specifies a binary image out of the plurality of binary images which is binarized with a binarization threshold larger than the maximum value of the binarization threshold and in which the black pixel ratio in the specified local area is smaller than the threshold of the black pixel ratio threshold, and takes a minimum binarization threshold out of binarization thresholds used for generating the specified binary image as the optimal binarization threshold.

5. The character noise eliminating apparatus, as claimed in claim 1, wherein the image is an entire image divided into a plurality of partial images depending on a character noise density, and the density converted image or the synthetic image generated for each of the partial images is synthesized to generate the density converted image or the synthetic image for the entire image.

6. A character noise eliminating means for eliminating a character noise which is an atypical shaped background noise from a fingerprint or a palm print image, the means comprising:
    a character noise area detecting means for detecting a character noise area, which is an area corresponding to the character noise, from the image;
    a density conversion area layer determining means for setting a plurality of density conversion area layers inside and outside the character noise area;
    a density converting means for, as a reference area of a target pixel, setting a neighboring pixel group within the same density conversion area layer as the density conversion area layer to which the target pixel belongs, and generating a density converted image by applying local image enhancement;
    an image enhancing means for generating an enhanced image by applying a local image enhancement to the image; and
    an image synthesizing means for generating a synthetic image by synthesizing the enhanced image and the density converted image taking a smaller density value among two density values of the enhanced image and the density converted image as the density value of a pixel in the density conversion area layer, and taking the density value of the enhanced image as the density value of a pixel outside the density conversion area layer; wherein the density converting means and the image enhancing device perform the local image enhancement in a same matter.

7. A character noise eliminating method for eliminating a character noise which is an atypical shaped background noise from an image of a fingerprint or a palm print, the method comprising:
    detecting a character noise area which is an area corresponding to the character noise, from the image;
    setting a plurality of density conversion area layers inside and outside the character noise area;
    generating a density converted image by setting a neighboring pixel group within the same density conversion area layer as the density conversion area layer to which the target pixel belongs as a reference area of a target pixel, and by applying with local image enhancement;
    generating an enhanced image applying a local image enhancement to the image; and
    generating synthetic image by synthesizing the enhanced image and the density converted image taking a smaller density value among density values of two images of the enhanced image and the density converted image as the density value of a pixel in the density conversion area layer, and taking the density value of the enhanced image as the density value of a pixel outside the density conversion area layer;
    wherein the local image enhancement is performed in generating the density converted image and generating the enhanced image in a same manner.

8. The character noise eliminating method as claimed in claim 7, comprising: in generating the density converted image, setting a neighboring pixel group within the same density conversion area layer as the density conversion area layer to which the target pixel belongs as the reference area, which is within a range from the target pixel about 1.5 times of pixel numbers corresponding to an average ridgeline pitch of a fingerprint or a palm print.

9. The character noise eliminating method as claimed in claim 7, comprising: in detecting the character noise area, detecting the character noise area by obtaining an optimal binarization threshold with which the image is binarized such that the image has a local area where ridgeline strength is to be a prescribed ridgeline strength threshold or more, and where a black pixel ratio which is a rate of a fingerprint ridgeline part binarized into a black pixel is smaller than a prescribed black pixel ratio threshold, and eliminating an independent black pixel area with less than a certain size as a ridgeline component from an optimal binary image which is the image binarized with the optimal binarization threshold.

10. The character noise eliminating method as claimed in claim 9, comprising:
    in detecting the character noise area, analyzing a plurality of binary images obtained by binarizing an image with a plurality of binarization thresholds;
    calculating a ridgeline area evaluation value of a local area at each binary image;
    specifying a local area and a maximum value of the binarization thresholds with which a maximum ridgeline area evaluation value in the entire binary images is to be a prescribed evaluation threshold value or more;
    specifying a binary image from a plurality of binary images which is binarized with a binarization threshold larger than the maximum binarization threshold and in which a black pixel ratio is smaller than a black pixel ratio threshold at a specified local area; and
    setting a minimum binarization threshold among the binarization thresholds used for generating the specified binary image as an optimal binarization threshold.

11. The character noise eliminating method as claimed in claim 7, wherein the image is an entire image divided into a plurality of partial images depending on a character noise density, and the density converted image or the synthetic image generated for each of the partial images is synthesized for generating the density converted image or the synthetic image for the entire image.

12. A non transitory computer readable medium having stored thereon a character noise eliminating program for eliminating a character noise which is an atypical shaped background noise from an image of a fingerprint or a palm print, the program makes a computer execute:

a character noise area detecting processing for detecting a character noise area, which is an area corresponding to the character noise, from the image;

a density conversion area layer determining processing for setting a plurality of density conversion area layers inside and outside the character noise area;

a density converting processing for, as a reference area of a target pixel, setting a neighboring pixel group within the same density conversion area layer as the density conversion area layer to which the target pixel belongs, and generating a density converted image by applying local image enhancement;

an image enhancing processing for generating an enhanced image by applying a local image enhancement to the image; and an image synthesizing processing for generating a synthetic image by synthesizing the enhanced image and the density converted image taking a smaller density value among density values of two images of the enhanced image and the density converted image as the density value of a pixel in the density conversion area layer, and taking the density value of the enhanced image as density value of a pixel outside the density conversion area layer;

wherein the local image enhancement is performed in the density converting processing and the image enhancing processing in a same manner.

13. The character noise eliminating program as claimed in claim 12, wherein in the density conversing processing, a neighboring pixel group within the same density conversion area layer as the density conversion area layer to which the target pixel belongs is set as the reference area, which is within a range from the target pixel about 1.5 times of pixel numbers corresponding to an average ridgeline pitch of a fingerprint or a palm print.

14. The character noise eliminating program, as claimed in claim 12, wherein in the character noise area detecting processing, the character noise area is detected by obtaining an optimal binarization threshold with which the image is binarized such that the image has a local area where ridgeline strength is to be a prescribed ridgeline strength threshold or more, and where a black pixel ratio which is a rate of a fingerprint ridgeline part binarized into a black pixel is smaller than a prescribed black pixel ratio threshold, and eliminating an independent black pixel area with less than a certain size as a ridgeline component from an optimal binary image which is the image binarized with the optimal binarization threshold.

15. The character noise eliminating program as claimed in claim 14, wherein in the character noise area detecting processing, a plurality of binary images obtained by binarizing the image with a plurality of binarization thresholds is analyzed;

a ridgeline area evaluation value in a local area at each binary image is calculated;

the local area and a maximum value of the binarization thresholds with which a maximum ridgeline area evaluation value for the entire binary images is to be a evaluation threshold value or more is specified;

a binary image out of a plurality of the binary images is specified, which is binarized with a binarization threshold larger than the maximum binarization threshold, and in which the black pixel ratio in the specified local area is smaller than the black pixel ratio threshold; and a minimum binarization threshold out of binarization thresholds used for generating the specified binary image is the optimal binarization threshold.

16. The character noise eliminating program as claimed in claim 12, wherein the image is an entire image divided into a plurality of partial images depending on a character noise density, and the program makes a computer execute a generating processing of the density converted image or the synthetic image for the entire image by synthesizing the density converted image or the synthetic image generated for each of the partial images.

* * * * *